United States Patent [19]

Piramoon et al.

[11] Patent Number: 5,643,168

[45] Date of Patent: Jul. 1, 1997

[54] COMPRESSION MOLDED COMPOSITE MATERIAL FIXED ANGLE ROTOR

[75] Inventors: Alireza Piramoon, Santa Clara; Robert Wedemeyer, Palo Alto; Michel Mark Fournier, Sacramento, all of Calif.

[73] Assignee: Piramoon Technologies, Inc., Mt. View, Calif.

[21] Appl. No.: 431,544

[22] Filed: May 1, 1995

[51] Int. Cl.⁶ .................................. B04B 5/02; B04B 7/08
[52] U.S. Cl. ........................................ 494/16; 494/81
[58] Field of Search ................................ 494/12, 16, 20, 494/31, 33, 43, 81, 85; 74/572, 573 R, 574

[56] References Cited

U.S. PATENT DOCUMENTS

| | | | |
|---|---|---|---|
| 3,248,046 | 4/1966 | Feltman, Jr. et al. | 494/16 |
| 3,913,828 | 10/1975 | Roy | 494/81 |
| 4,468,269 | 8/1984 | Carey | 494/81 X |
| 4,701,157 | 10/1987 | Potter | 494/81 X |
| 4,738,656 | 4/1988 | Piramoon et al. | 494/16 X |
| 4,781,669 | 11/1988 | Piramoon | 494/16 |
| 4,817,453 | 4/1989 | Breslich, Jr. et al. | 494/16 X |
| 4,824,429 | 4/1989 | Keunen et al. | 494/16 |
| 4,860,610 | 8/1989 | Popper et al. | 494/16 X |
| 4,991,462 | 2/1991 | Breslich, Jr. et al. | 494/16 X |
| 5,057,071 | 10/1991 | Piramoon | 494/16 |
| 5,362,301 | 11/1994 | Malekmadani et al. | 494/16 |
| 5,382,219 | 1/1995 | Malekmadani | 494/16 |
| 5,505,684 | 4/1996 | Piramoon | 494/16 |

FOREIGN PATENT DOCUMENTS

| | | | |
|---|---|---|---|
| 48-30431 | 9/1973 | Japan | 494/81 |
| 2097297 | 11/1982 | United Kingdom | 494/16 |

*Primary Examiner*—Charles E. Cooley
*Attorney, Agent, or Firm*—Townsend and Townsend and Crew LLP

[57] ABSTRACT

A fixed angle centrifuge rotor body is constructed from compression molded composite material. The rotor body has a frustum shaped peripheral contour about a central spin axis between a base end and an apex end. The body has net shaped angled sample tube apertures defined in the rotor body extending from openings in the apex end adjacent the spin axis of the rotor body to bottom portions of the sample tube apertures more remote from the spin axis of the rotor body. The rotor body is formed from resin cured about discontinuous composite fiber with the major axis of the discontinuous fiber disposed normal to the spin axis of the rotor body interior of the rotor body. The resin cured discontinuous composite fibers exceed 40 weight percent of the cured rotor product and have no visible layering between respective fibers. The resin cured discontinuous composite fibers have minor vertical excursion parallel to the spin axis of the rotor and relatively no kinking along their respective lengths. The resin cured discontinuous fibers are disposed parallel to the surfaces of and about molded sample tube apertures in the rotor body.

7 Claims, 20 Drawing Sheets

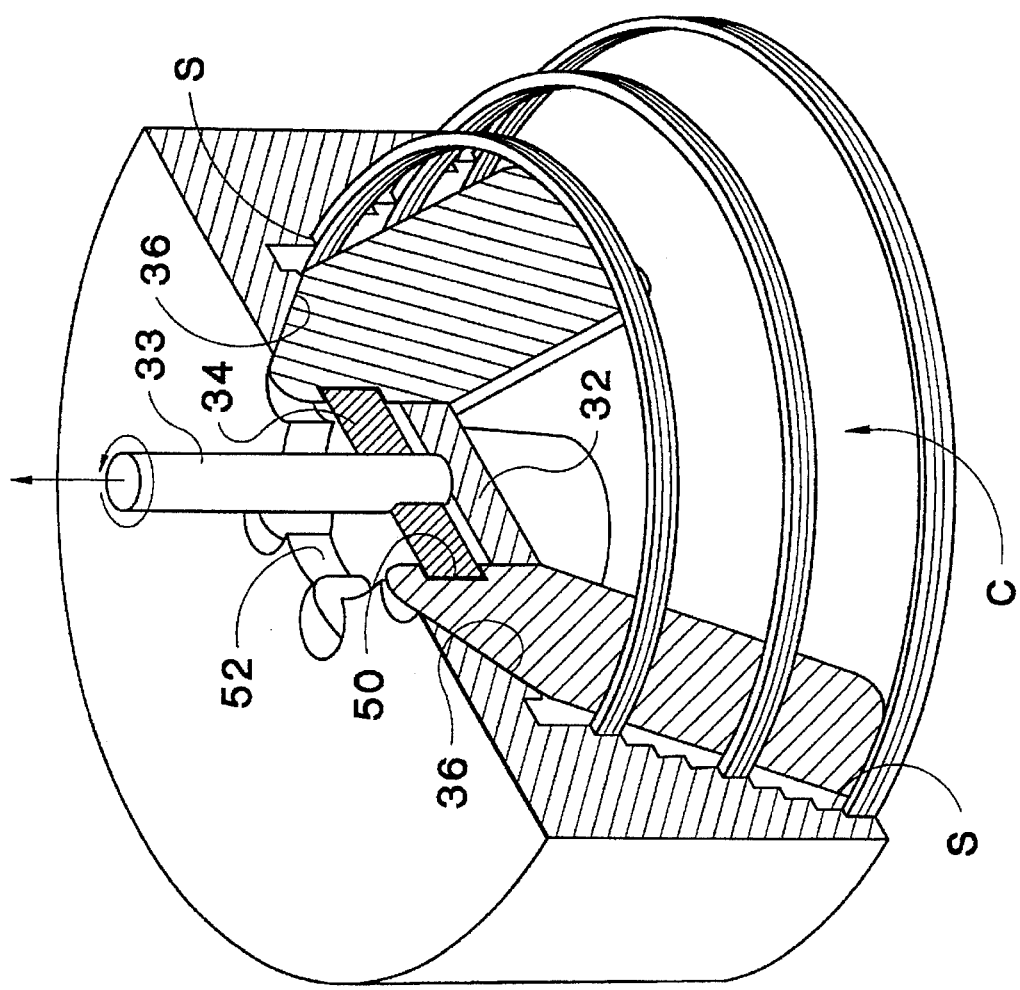
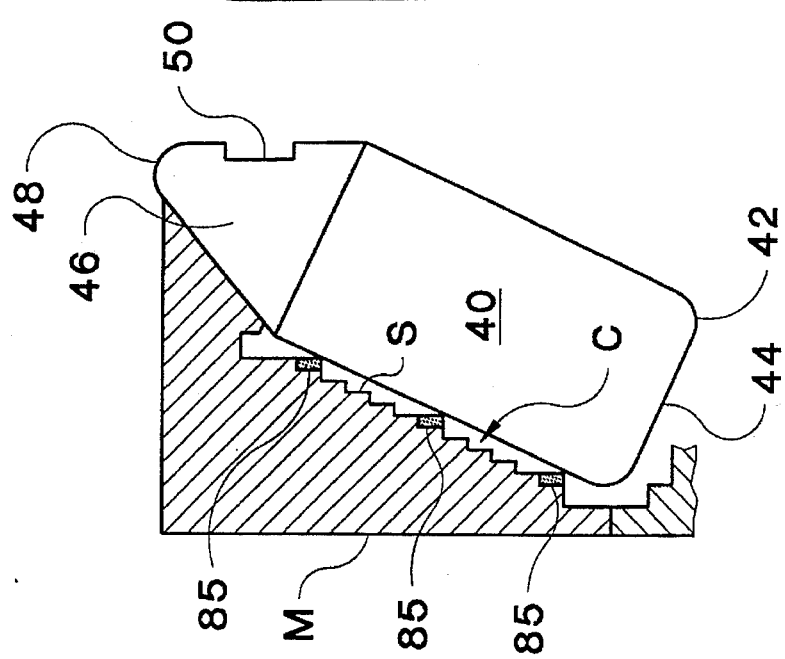
FIGURE 7A
FIGURE 7B

COMPRESSION MOLDED COMPOSITE MATERIAL FIXED ANGLE ROTOR

This invention relates to composite material centrifuge rotors of the so-called "fixed angle" variety. More particularly, a method and apparatus for the compression molding of a fixed angle rotor is disclosed.

BACKGROUND OF THE INVENTION

Fixed angle centrifuge rotors are known. In such rotors, sample tube apertures of the rotor are disposed at a "fixed angle" in the normal range of 20° to 34°. Material to be centrifugated is placed in sample tubes within the sample tube apertures in the rotor body and spun at high speed. Classification of the material within the sample tubes occurs. At the end of such centrifugation, the classified sample is withdrawn and further processed.

It is known to make fixed angle rotors from composite materials. Further, it has been suggested to make such fixed angle rotors with chopped or discontinuous fibers. Unfortunately, fiber alignment of such chopped or discontinuous fibers has heretofore not been possible.

It is known that composite materials have anisotropic strength of material properties. Specifically, such materials have great resistance to tension, but are generally poor in resistance to all other modes of loading. In order to take maximum advantage of the tensile strength of such fibers, fiber alignment to a disposition where stresses of centrifugation can be resisted is required. This usually—but not always—requires that the fibers be aligned either normal to the spin axis or radially about the spin axis.

Compression molding of composite fiber parts is known. To date, such compression molding has not be applied for the manufacture of centrifuge rotors.

SUMMARY OF THE INVENTION

A method and apparatus for the compression molding of composite fiber fixed angle rotors is disclosed. A female mold member defines a closed cylinder cavity for molding the bottom surface of the rotor, this cavity usually defining a frustum shaped central cavity complimentary to and concentric with the spin axis of the ultimately formed rotor. A male mold member having a complimentary cylindrical profile contains a frustum shaped inner cavity with the apex of the frustum disposed to the inner portion of the cylinder and the base end of the frustum exposed to the cylindrical opening of the female mold. This frustum shaped inner cavity defines the exterior frustum shape of the ultimately produced rotor and defines between the exterior frustum profile and the frustum shaped inner cavity a rotor body wall having sufficient thickness to receive the sample tube apertures. At the apex end of the frustum shaped cavity in the male mold member, there is located a locking system for maintaining sample tube aperture cores. These sample tube aperture cores are locked within the frustum cavity in the precise alignment of the ultimately formed sample tubes of the rotor. Loading of the mold with resin pre-impregnated fiber typically occurs in the frustum shaped cavity of the male mold member and at the bottom of the female mold member. Sheet molding compound—flat strips of resin impregnated discontinuous fibers—are pre-cut and placed within the mold with the plane of the material normal to the spin axis of the ultimately produced rotor. Reinforcement either with composite cloth, tape, or pre-wound and cured fibers can likewise be loaded with fiber alignment anticipating the strength characteristics of the ultimately produced rotor. With pre-heating, ramped heating to curing temperatures accompanied by ramped compression of the male and female mold sections one towards another, a rotor is rapidly formed in about one hour. Upon rotor formation, the sample tube aperture cores are released from the male mold section, the male and female mold sections parted, and the molded rotor withdrawn. Thereafter, the sample tube aperture core members are individually withdrawn, leaving the net shape compression molded rotor.

It will be understood that compression molding imparts to the ultimately produced the ability to maintain a high fiber to resin ratio in the ultimately produced rotor. Rotors having high fiber content capable of withstanding the forces of centrifugation are produced.

It is further possible to load the mold with pre-cured fiber parts. In one embodiment, pre-wound fiber rings are added between the frustum shaped mold exterior and the locked sample tube aperture cores to both reinforce the ultimately produced rotor and to assist in supporting the sample tube aperture cores against the considerable forces encountered during compression molding.

In the compression molding of the sheet molded composite discontinuous material, the discontinuous fibers are disposed normal to the spin axis of the rotor before the rotor is molded. As the rotor is molded, these fibers conform to the molding forces but maintain there general alignment normal to the spin axis of the rotor. Fibers flow around the sample tube aperture cores radially and from below the sample tube aperture cores. There results a centrifuge rotor having discontinuous fiber where the fibers are aligned in the finally produced rotor for optimum resistance to the forces of centrifugation.

BRIEF DESCRIPTION OF THE DRAWINGS

FIG. 7A illustrates the male and female mold members similar to FIG. 3A here illustrating the installation of pre-wound and cured fiber rings to the male mold member, the pre-wound and cured fiber rings being placed between the clustered sample tube aperture cores and the frustum shaped cavity in the male mold member;

FIG. 7B illustrates a section of the male mold member taken radially of the male mold member of FIG. 7A here illustrating the ring placement between the frustum shaped conical cavity of the male mold member and the sample tube aperture cores, it being noted that the ring member fits into preformed steps interior of the frustum shaped cavity of the male mold member to help brace the sample tube aperture cores in their angled clustered relationship;

DESCRIPTION OF THE PREFERRED EMBODIMENT

Figure 1:
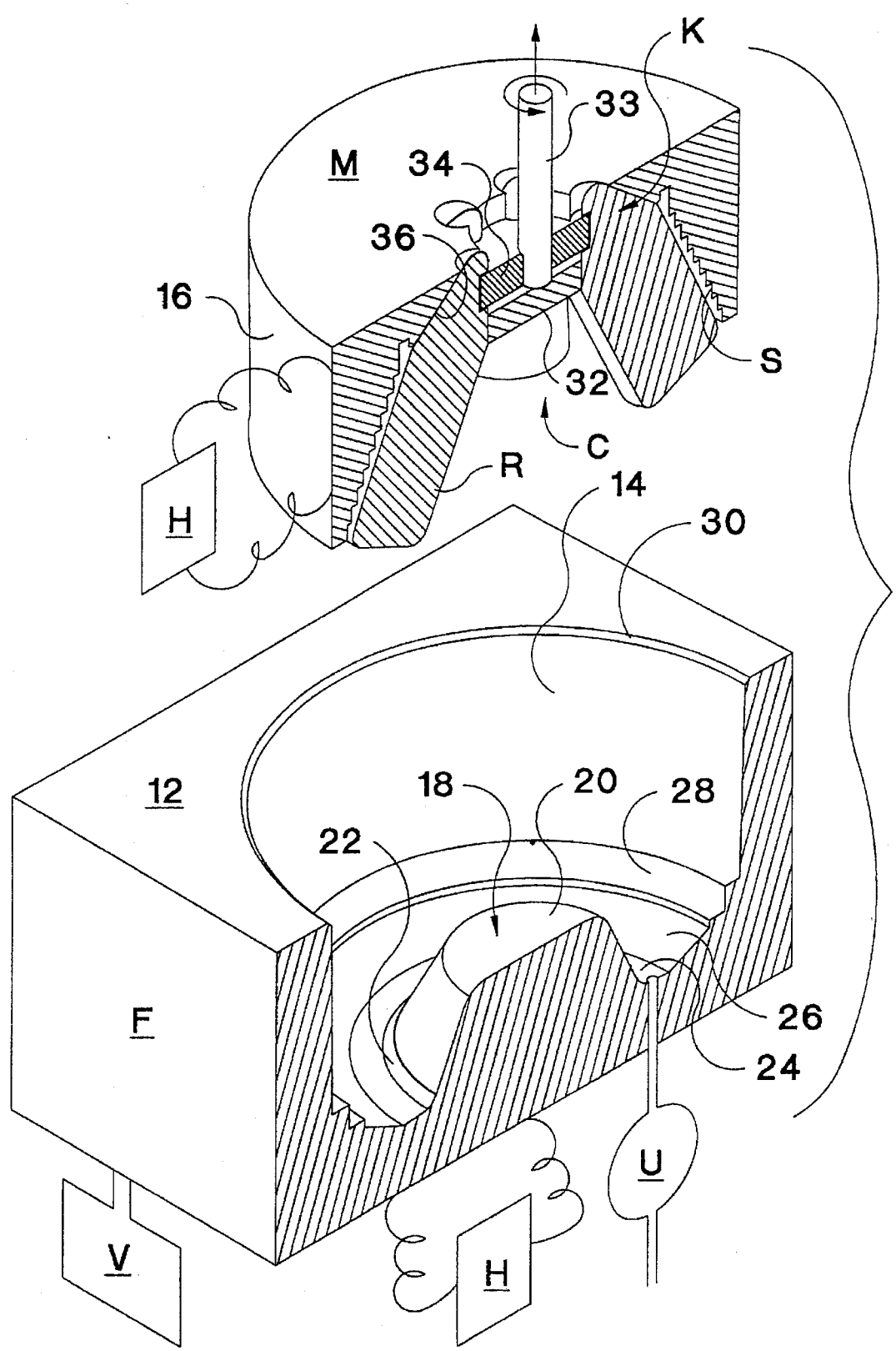
FIG. 1 illustrates exactly one half of the male mold member and the female mold member showing the male mold member overlying the female mold member with the sample tube aperture cores attached within the frustum shaped cavity of the male mold member.
Figure 2:
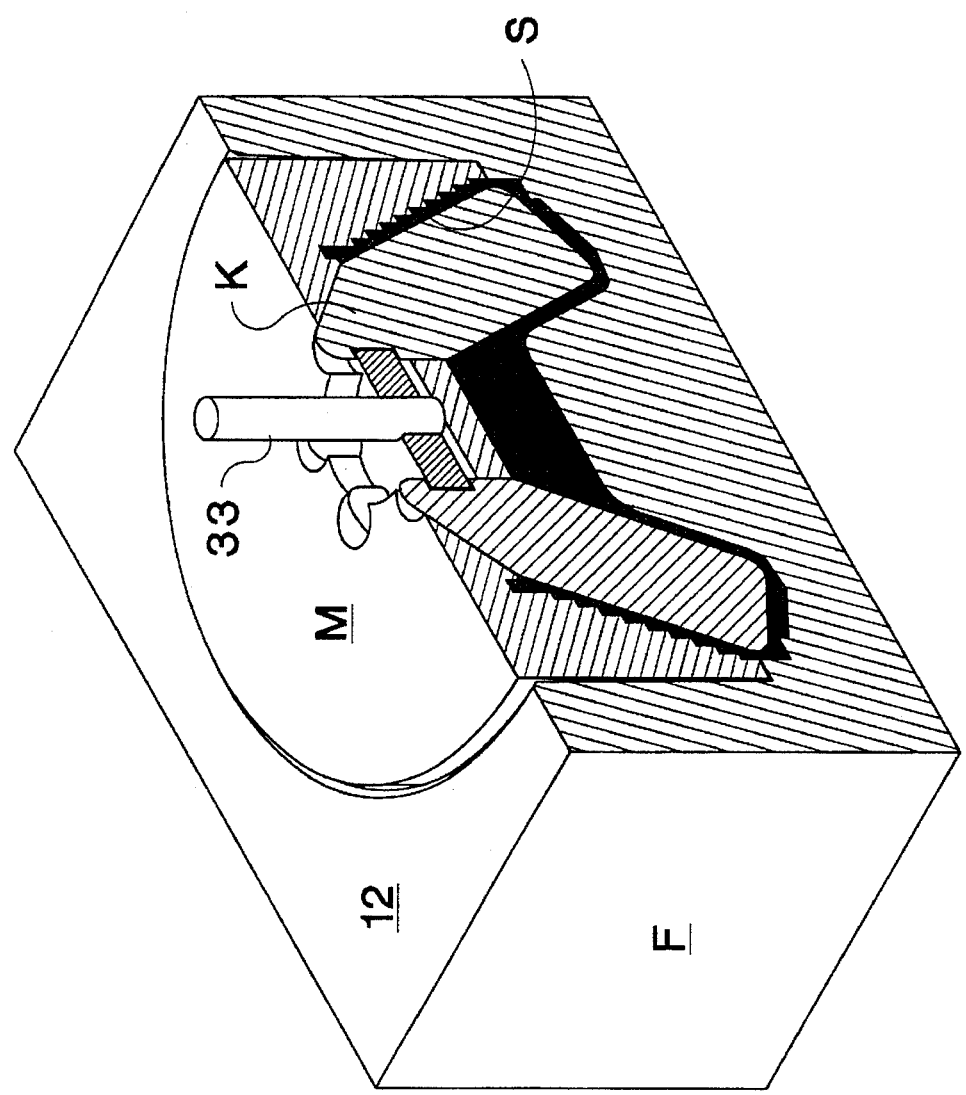
FIG. 2 illustrates the male and female mold members of FIG. 1 filed with resin impregnated composite material and placed under compression to form a net shaped composite rotor body.

Referring to FIG. 1, male mold member M is shown overlying female mold member F. Neither mold member is charged with material to be compression molded. The configuration of the respective mold members will be set forth first; the operation of the respective mold members will be thereafter discussed.

Taking female mold member F, which includes mold member or forging 12 having cylindrical bore 14 for fitting to cylindrical contour 16 of male mold member M. Sufficient clearance is provided between cylindrical bore 14 and cylindrical contour 16 so that resin only and not significant amounts of fiber can escape from the joined, compressed, heated and vibrated male mold member M and female mold member F during compression molding of a rotor body.

Female mold member F must define the lower contour of the rotor body ultimately formed. Consequently, it includes male frustum protrusion 18 having apex circular surface 20 with base 22 integral with the female cavity of the mold. Female mold member F is completed with ring surface 24, cambered surface 26, and step surface 28. As is conventional, gathering surface 30 is provided at the top of cylindrical bore 14 of female mold member F.

It will be understood that during compression molding, heating, application of a vacuum, and vibration are utilized.

Accordingly, vibrator V, heater H, and vacuum pump U are all schematically shown. As such members are conventional, they will not be further illustrated or discussed herein.

Having set forth female mold member F, male mold member M will now be discussed.

Male mold member M includes frustum shaped central cavity C and sample tube aperture core cluster K.

Frustum shaped central cavity C is relatively easy to understand. It includes a plurality of machined internal female steps S following the frustum profile of frustum shaped central cavity C. These internal female steps S will be shown later to leave corresponding male steps T in the ultimately formed rotor body B (See FIG. 9A). Thus, the process of compression molding here disclosed will be understood to result in the so-called "net shape" or finished state of rotor body B.

Figure 7E:
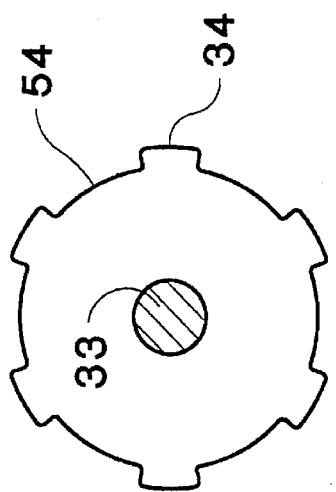
FIG. 7E is a detail of a release member for the sample tube aperture cores.

Sample tube aperture core cluster K is some what more complicated. Cluster K here includes six sample tube aperture cores R. This number can vary to greater or less numbers of sample tube aperture cores R. Referring for example to FIG. 7B, sample tube aperture cores R can be understood. Those having experience with centrifugation will understand that fixed angle rotors are required to have sample tube apertures A (See FIG. 9A). In the compression molding process here described, it is the function of sample tube aperture cores R to form sample tube apertures A during the compression molding process. For this to occur, sample tube aperture cores R must be properly held in sample tube aperture core cluster K before and during compression molding and conveniently removable after compression molding has occurred.

Continuing with FIG. 7B, each sample tube aperture core R includes male cylindrical body portion 40 having relieved bottom surface 42 and circular bottom 44.

The upper portion of each sample tube aperture core R includes frustum shaped upper end 46 with rounded apex 48. The structures of each sample tube aperture core R is completed with circular segment notch 50. It is the purpose of circular segment notch 50 to enable the respective sample tube aperture cores R to be held in sample tube aperture core cluster K during the compression molding process.

Viewing FIG. 7A, the function of male mold member M at frustum shaped central cavity C to hold sample tube aperture cores R in sample tube aperture core cluster K can be easily understood. At the upper portion of male mold member M in frustum shaped central cavity C, central male mold aperture 52 is configured. Machined at six equal angular intervals around central male mold aperture 52, there are frustum shaped core retaining apertures 36. These respective frustum shaped core retaining apertures 36 each receive and hold frustum shaped upper end 46 of each sample tube aperture core R.

It remains to securely hold the respective sample tube aperture cores R in sample tube aperture core cluster K during the compression molding process. Specifically, keying disc 34 fits interior of circular segment notch 50 on each sample tube aperture core R. Keying disc 34 is urged upward by gathering disc 32. Such upward urging occurs through attached gathering shaft 33 which is typically urged upward by standard threading or other conventional apparatus (schematically shown). There results sample tube aperture core cluster K held together with relatively great force sufficient to withstand the dynamic forces of compression molding.

It will be understood that once compression molding is finished, release of sample tube aperture cores R from the formed sample tube apertures A and rotor body B is required. To effect such release, male mold member M and female mold member F are first parted. Once this has occurred, keying disc 34 is rotated. Upon rotation, keying slots 54 in keying disc 34 register to circular segment notch 50 in each sample of the tube aperture cores R. Thereafter, rotor body B is withdrawn from frustum shaped central cavity C of male mold member B. (See FIG. 7E) Keying disc 34 can thus be removed. It only remains that the respective sample tube aperture cores R are removed from the now formed sample tube apertures A to compete the net shaped rotor body B illustrated in FIG. 9A.

One factor related to the difference between compression molding as illustrated herein and injection molding should be emphasized. We have found that it is required that centrifuge rotors have high fiber content to withstand the considerable forces of centrifugation. This being the case, a high fiber content—in the order of 50% of the weight percent of the resin fiber mixture is required. Such a high fiber content material is absolutely unsuitable for injection molding; injectors cannot conveniently handle or inject a resin/fiber mixture with such a high fiber content.

Further, we do not here rely on so-called resin transfer molding. That is to say, we do not charge the mold first with totally unimpregnated fiber and thereafter inject resin without supplying the considerable compression forces here illustrated. Such molding would have the possibility of leaving voids in rotor body product which would ultimately render the final product not suitable for centrifugation.

It will be understood that we show female mold member F underneath male mold member M. This can be reversed. Further, a vertical relative disposition between the respective portions of the mold is not required. For example, the mold members could move horizontally towards and away from one another—although this is not preferred.

Having set forth the mechanics of the mold, the loading of the compression mold with material for compression molding can now be discussed in detail.

Figure 3A:
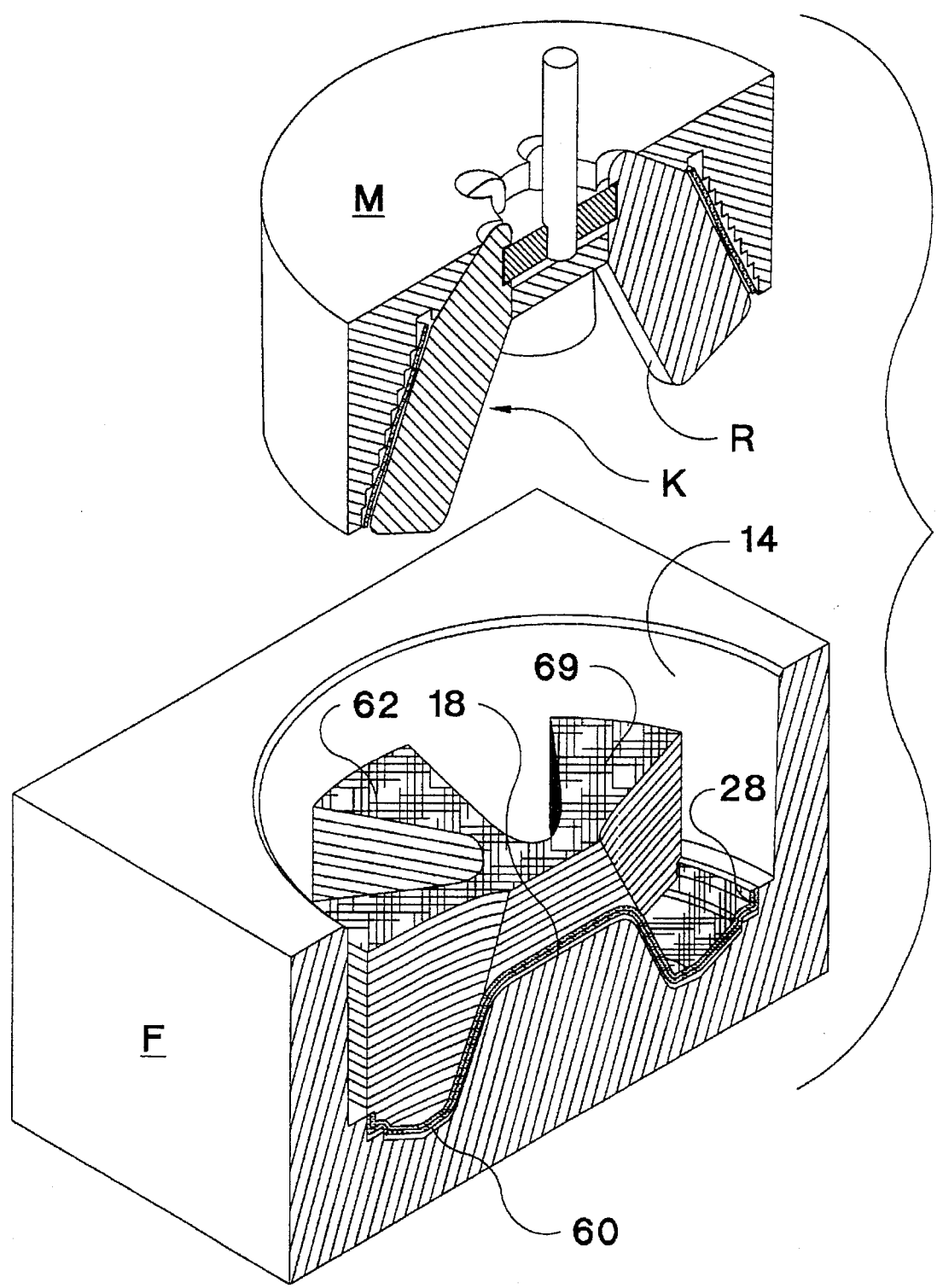
FIG. 3A illustrates the male and female mold members of FIG. 2 in exploded relationship one apart from the other showing both mold members loaded with composite materials here illustrating the male mold member assembled and the female mold member having sheet molding compound placed within the bottom portion of the open cavity.
Figure 3B:
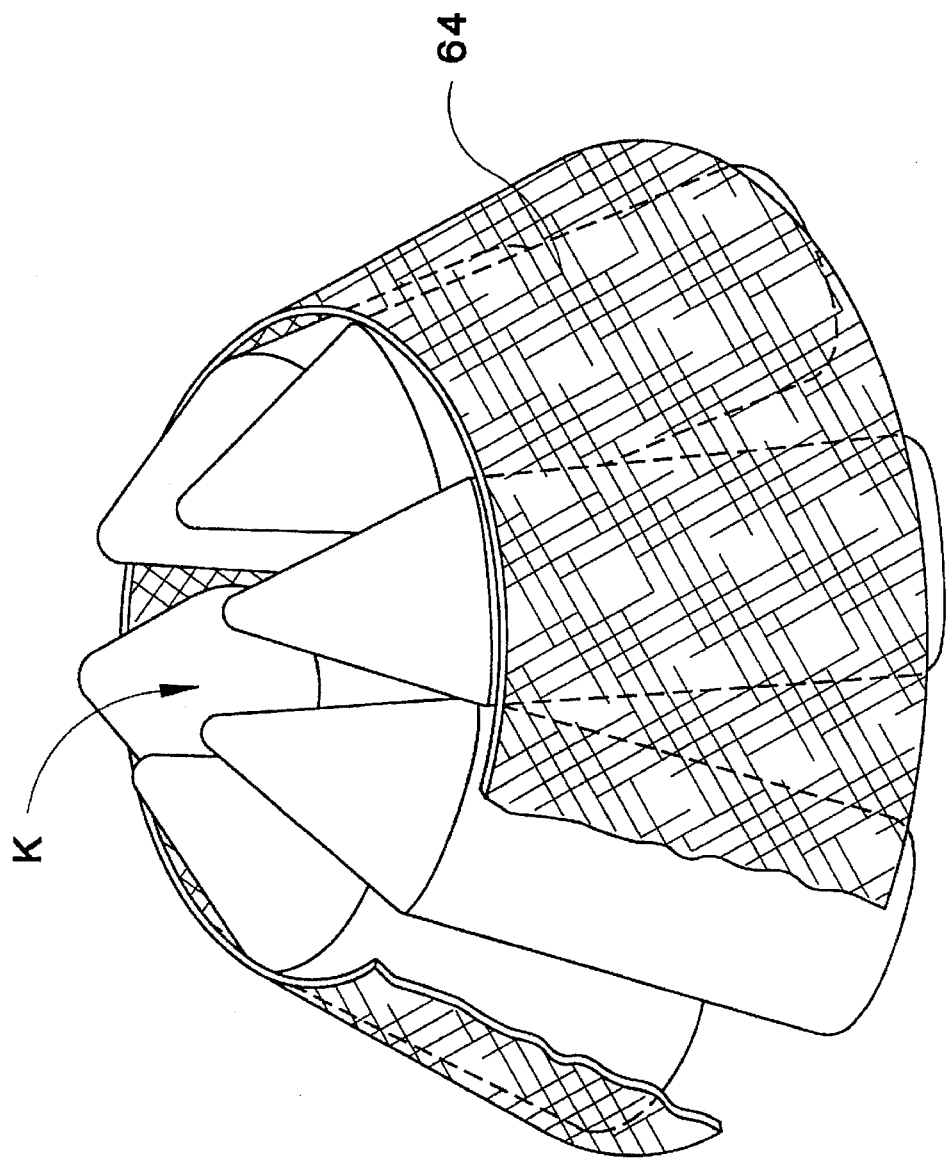
FIG. 3B illustrates the sample tube aperture cores attached to one another in the molding relationship with the frustum shaped periphery being warped with material selected from the group consisting of unidirectional tape, woven composite fabric, or sheet molded compound.

Referring to FIGS. 3A and 3B, a first loading of male mold member M and female mold member F can be understood. In this embodiment, resin impregnated composite fiber precut discs 60 cover the bottom of cylindrical bore 14 in female mold member F. As can be seen, these respective resin impregnated composite fiber precut discs 60 extend over male frustum protrusion 18 to step surface 28 at the bottom of cylindrical bore 14 of female mold member F. It is preferred that these respective resin impregnated composite fiber precut discs 60 consist of preferably of sheet molding compound. They can be chosen from the group including sheet molded compound, pre-impregnated composite fiber tape, or pre-impregnated composite fiber fabric.

Overlying resin impregnated composite fiber precut discs 60 there are placed central fiber layers 62. Central fiber layers 62 are preferably formed from sheet molded compound 65. Some discussion of this commercially available compound and its applicability is warranted. Accordingly, the reader's attention is directed to FIG. 10A.

Figure 10A:
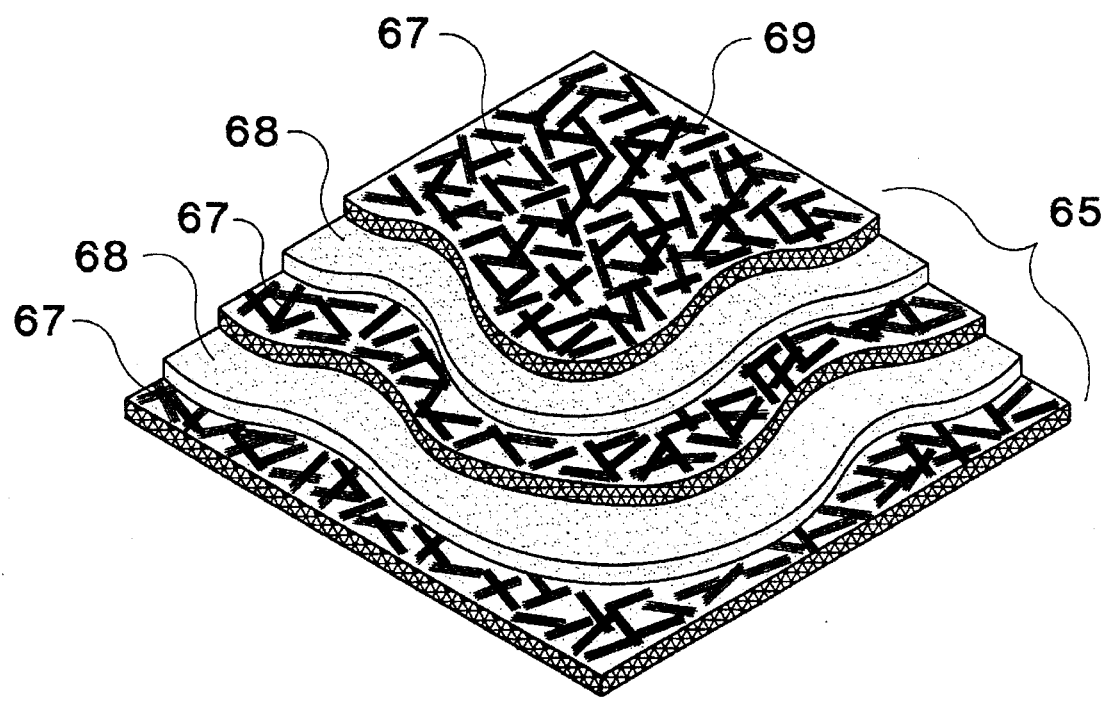
FIG. 10A illustrates sheet molded compound in section so that the imparting of directional configuration during compression molding can be understood.

Referring to FIG. 10A, it can be seen that such sheet molded compound 65 consists of chopped fiber layers 67 alternating with resin layers 68. This alternating construction can be found in SMC produced by Quantum Composite of Midland, Mich.

Figure 9A:
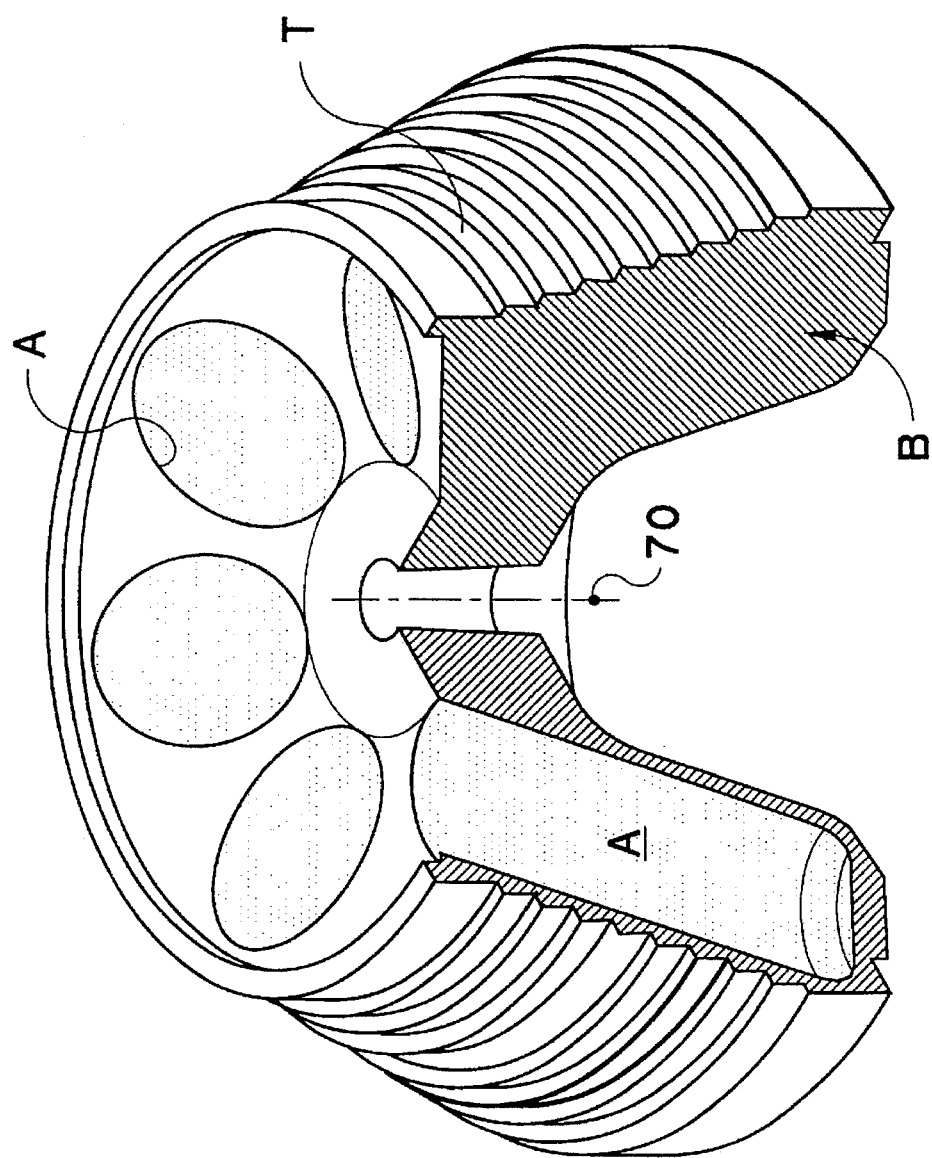
FIG. 9A illustrates the net shaped rotor body when removed from the male and female mold members of FIG. 2 after compression molding, it being noted that the rotor body here illustrated has been provided with peripheral steps to enable convenient fiber winding of the frustum shaped periphery of the rotor.

Referring briefly to FIG. 9A, it will be understood that when rotor body B spins about rotor spin axis 70 at high rotational velocity, major stress will be exerted normal to the spin axis. It will be understood that if the discontinuous fibers 69 illustrated in FIG. 10A could be oriented overall substantially normal to rotor spin axis 70, rotor body B would have maximum resistance to the forces of centrifugation.

Referring back to FIG. 3A, and central fiber layers 62, it will be understood that these respective layers are preferably made of sheet molded compound 65. It has been found that during molding, the respective discontinuous fibers 69 of central fiber layers 62 maintain there respective major horizontal disposition normal to rotor spin axis 70 of the ultimately formed rotor body B. Further, upon curing in the compression molding process here disclosed, the respective layering seen in FIG. 10A, is no longer visible. Instead, the respective discontinuous fibers 69 have major alignment normal to rotor spin axis 70 but form in the net shape rotor body B without any apparent layering being present.

It should be further understood that when sheet molded compound 65 is molded, some vertical orientation of discontinuous fibers 69 occurs. This vertical orientation imparts to rotor body B resistance to vertical forces placed on the rotor during centrifugation. For example, sample tubes within sample tube apertures A can exert a considerable force on the respective bottoms of the sample tube apertures A. Where the rotor is made of composite fiber layers normal to rotor spin axis 70, such composite fiber layers have been known to delaminate under such centrifugation generated forces. It has been found that sheet molded compound 65 and the minor vertical orientation of discontinuous fibers 69 advantageously resists such forces.

Finally, it should be understood that during compression molding, central fiber layers 62 when made of sheet molded compound 65 have the advantage of readily deforming and conforming intimately about the shape of female mold member F and particularly the more intricate three dimensional configuration of frustum shaped central cavity C with central sample tube aperture core cluster K. It is for this reason that in the embodiment illustrated in FIGS. 3A and 3B, it is preferred to have central fiber layers 62 made from sheet molded compound 65.

It will be understood that dependent upon the overall strength of the finally manufactured rotor body B, other materials may be added interiorly of the mold. For example micro-balloons (glass, phosphor, or carbon) can be added. Additionally, and dependent upon the stress location in rotor body B, materials such as ordinary fiber glass may be used.

Referring to FIG. 3B, wrapping of sample tube aperture core cluster K with resin impregnated fiber layer 64 is illustrated. Such wrapping here consists of resin impregnated woven fabric. It will be understood that other materials could be used including woven composite fabric not impregnated with resin, composite tape (optionally resin impregnated), or sheet molded compound.

Once the particular female mold member F and male mold member M are respectively loaded, compression molding can occur. With mold separation as previously described, rotor body B as illustrated in FIG. 9A results.

The remaining portions of the description herein will assume that compression molding occurs. Those have skill with composite fibers and resins will realize that the temperatures, pressures and duration required in curing will vary with the resin system mixture involved. While this requires considerable testing when new formulations are utilized with particular molds, persons having skill in the curing of composite fibers impregnated with resins can readily determine such parameters.

Figure 4A:
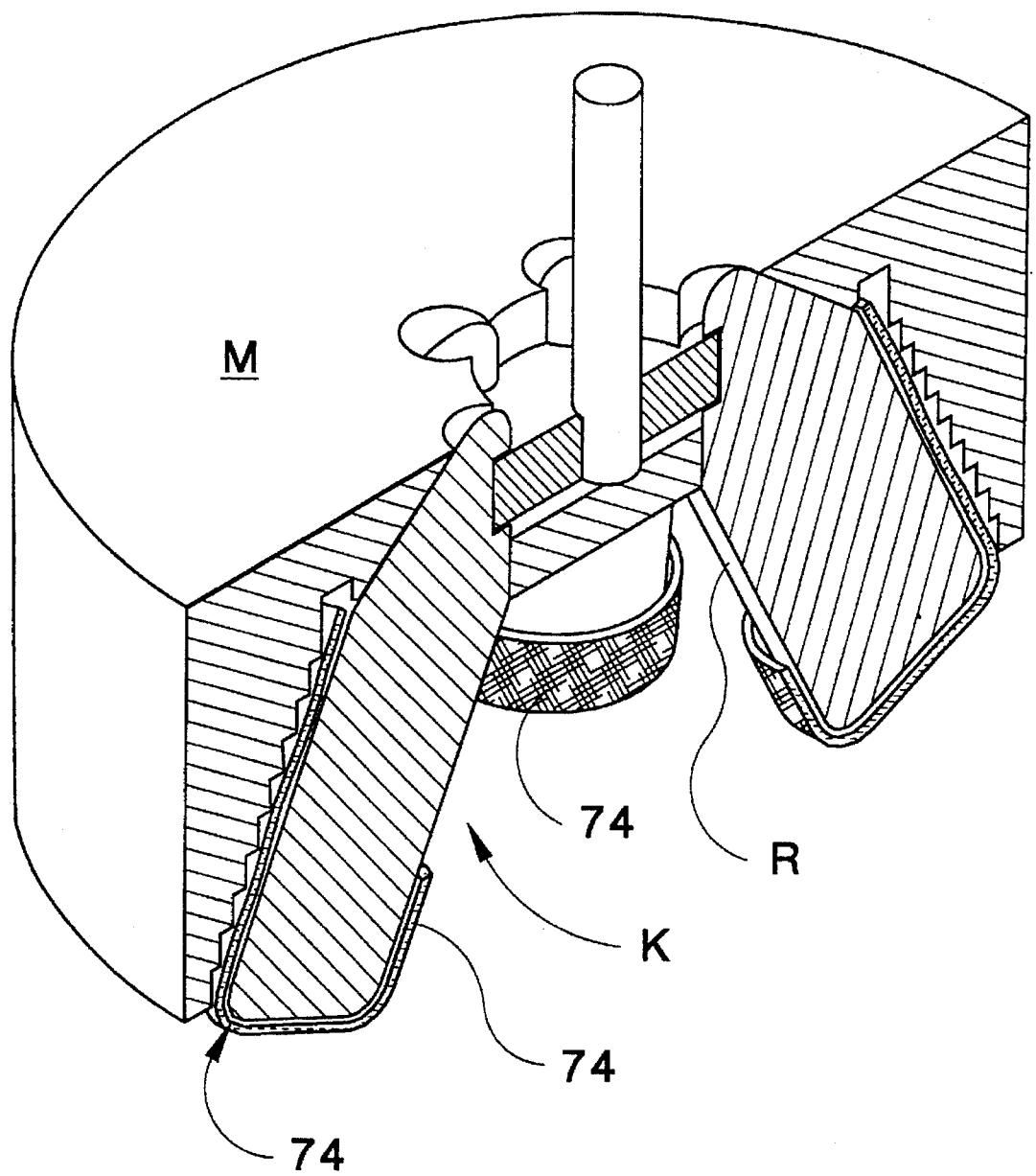
FIG. 4A illustrates the male and female mold members of FIG. 3A loaded with composite materials here illustrating the male mold member assembled and having a fabric winding at the bottom of the sample tube aperture cores.
Figure 4B:
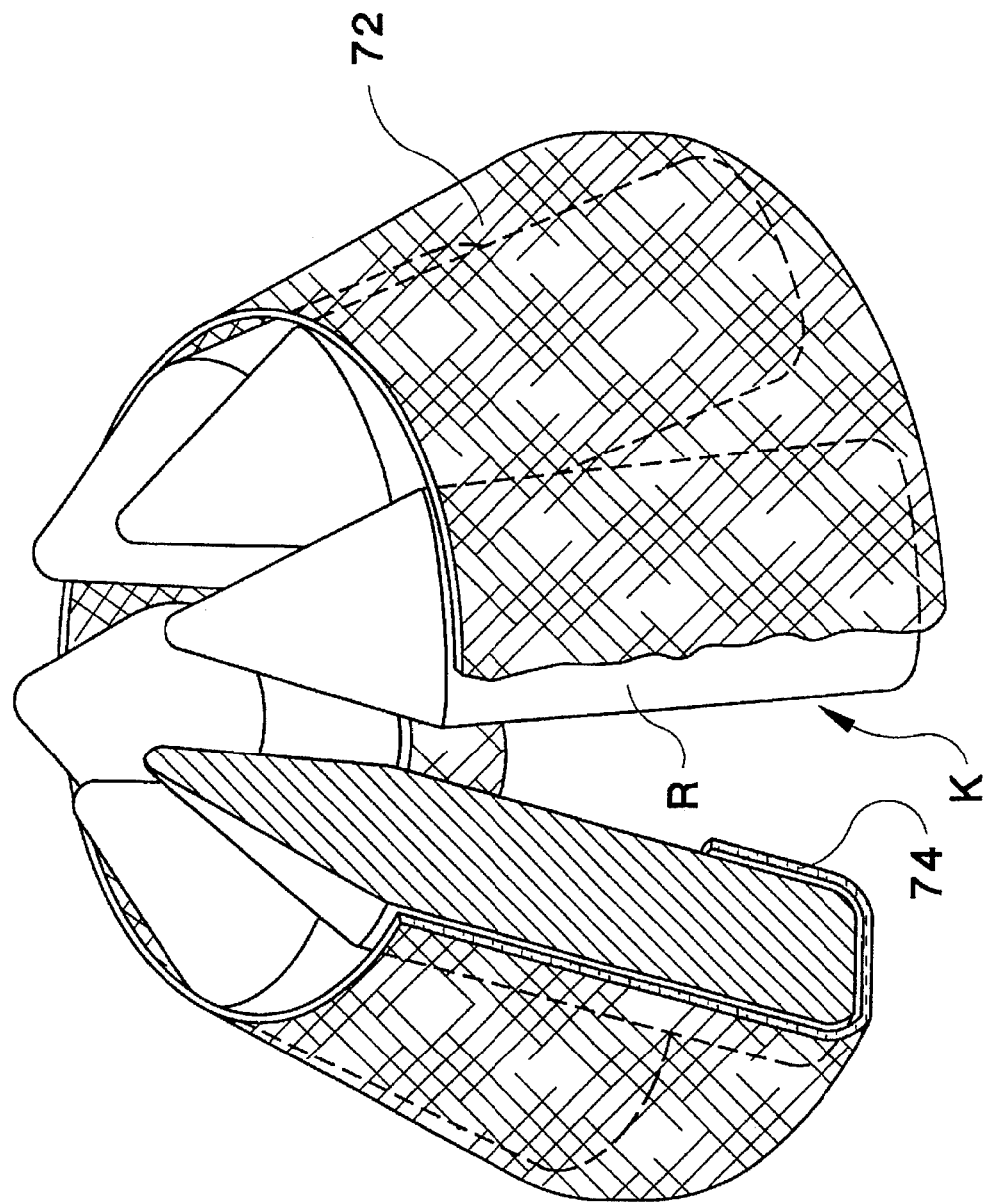
FIG. 4B illustrates the sample tube aperture cores attached to one another similar to FIG. 3B with the frustum shaped periphery and the lower portion of the sample tube aperture cores being wound with material selected from the group consisting of unidirectional tape, woven composite fabric, or sheet molded compound.

Referring to FIG. 4A and 4B, sample tube aperture core cluster K is wrapped at each sample tube aperture core R with portions of depending composite material wrap 72. Depending composite material wrap 72 is slit at intervals between sample tube aperture cores R and has the slit portion extending below sample tube aperture core cluster K wrapped about the lower portion of each sample tube aperture core R. It will be appreciated that this configuration when molded about sample tube aperture cores R produces sample tube apertures A having composite fiber reinforcing the bottom of the apertures A. It will be understood that such sample tube apertures A have high resistance to the force of sample tubes bearing vertically downward at the bottom of the respective sample tube apertures.

Figure 5:
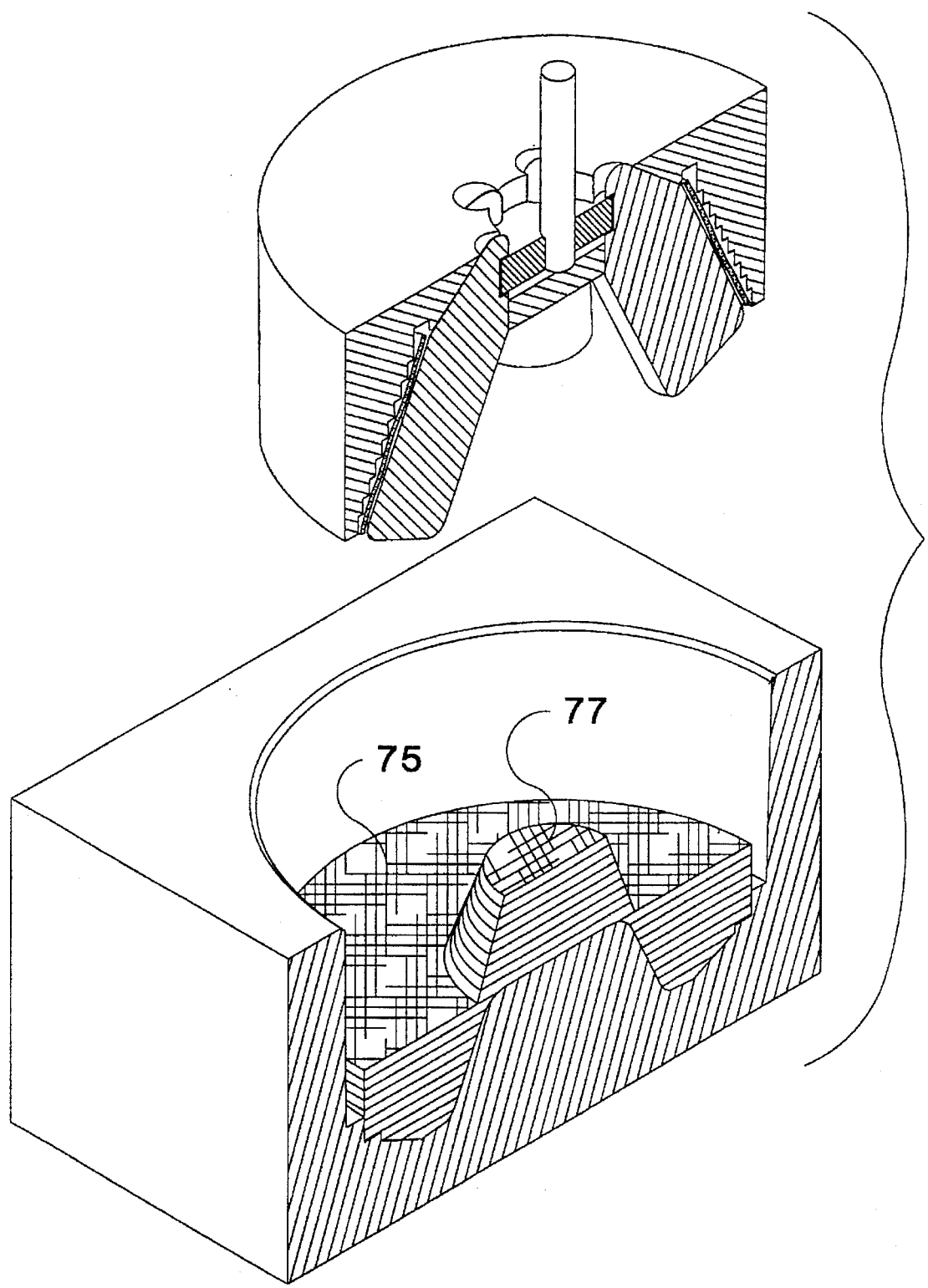
FIG. 5 is a view similar to FIG. 3A illustrating the loading of the female mold member with laminates of materials chosen from the groups consisting of sheet molded compound, resin impregnated tape and resin impregnated woven cloth.

FIG. 5 illustrates a loading of female mold member F with sheet molding compound rings 75 and sheet molding compound discs 77. Unlike the example previously given in FIG. 3A, reliance is placed upon sheet molding compound discs 77 to conform around sample tube aperture cores R when in the fluid state under compression molding. This phenomena can be readily understood.

Specifically, as sheet molding compound rings 75 and sheet molding compound discs 77 are heated, compressed and vibrated, the laminate structure of the cut material is lost. The respective fibers within rings 75 and discs 77 conforms around sample tube aperture cores R as held in sample tube aperture core cluster K. Unfortunately, this will interfere with some of the normal alignment of the fibers with respect to rotor spin axis 70 (See FIG. 9A). It does have the advantage of causing many fibers to conform to the surface of sample tube aperture cores R and thus form sample tube apertures A having fibers disposed in the plane of the surface of the sample tube apertures.

Figure 6B:
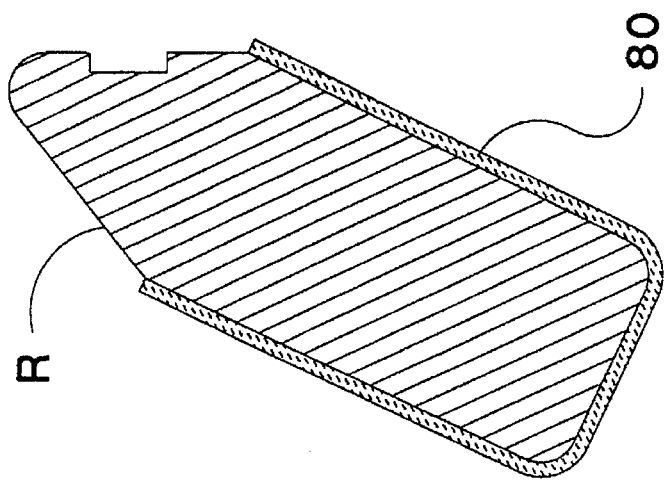
FIG. 6B illustrate a single sample tube aperture core having the tubularly wound braided composite material wrapped about the sample tube aperture core before installation to the core cluster illustrated in FIG. 6A.
Figure 6A:
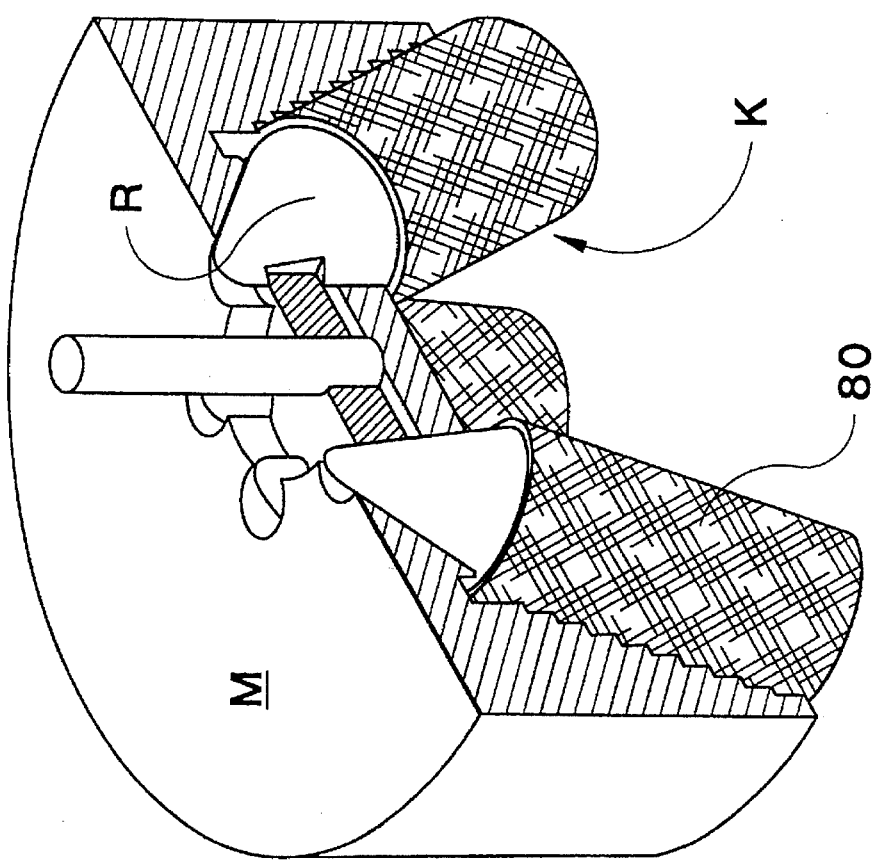
FIG. 6A is a view similar to FIG. 3A of the male and female mold members here illustrating the sample tube aperture cores with tubularly wound braided composite material for molding the braided composite material integrally with the rotor body.

Individual reinforcement of sample tube apertures A is possible alone or in combination with the other techniques mentioned herein. Referring to FIGS. 6A and 6B, the respective sample tube aperture cores R are shown wrapped in composite fiber cloth sock 80. Composite fiber cloth sock 80 can be either pre-impregnated or alternate "dry", in which case reliance on acquiring resin from adjacent pre-impregnated fiber is required. It will additionally be appreciated that respective composite fiber cloth socks 80 can be either fully or partially cured before placement on their respective sample tube aperture cores R.

Referring to FIGS. 7A and 7B, integral molding of a rotor body is illustrated where wound and pre-cured fiber tension rings 85 are utilized. Specifically, and referring to FIG. 7A, wound and pre-cured fiber tension rings 85 are wound with a diameter to fit into internal female steps S. These respective rings 85 fit to the internal portion of finished rotor body B and leave exteriorly thereof the respective male steps T seen in FIG. 9A. Thus it is possible to internally reinforce rotor body B.

Referring to FIG. 7B, an additional advantage of wound and pre-cured fiber tension rings 85 can be seen. Examining male mold member M at frustum shaped central cavity C in the interface between internal female steps S and sample tube aperture cores R, it will be seen that wound and pre-cured fiber tension rings 85 occupy the interface precisely. That is to say, wound and pre-cured fiber tension rings 85 contact internal female steps S on one side and sample tube aperture cores R on the other side. With this configuration, the proper angularity of sample tube aperture cores R in sample tube aperture core cluster K is assured, even in the presence of the considerable forces encountered during compression curing of the resin and fiber. Thus wound and pre-cured fiber tension rings 85 have a secondary function in bracing sample tube aperture cores R relative to male mold member M at frustum shaped central cavity C.

Figure 7C:
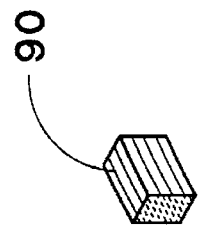
FIG. 7C illustrates a ring segment for placement between a sample tube aperture core and the frustum shaped cavity interior of the male mold member.
Figure 7D:
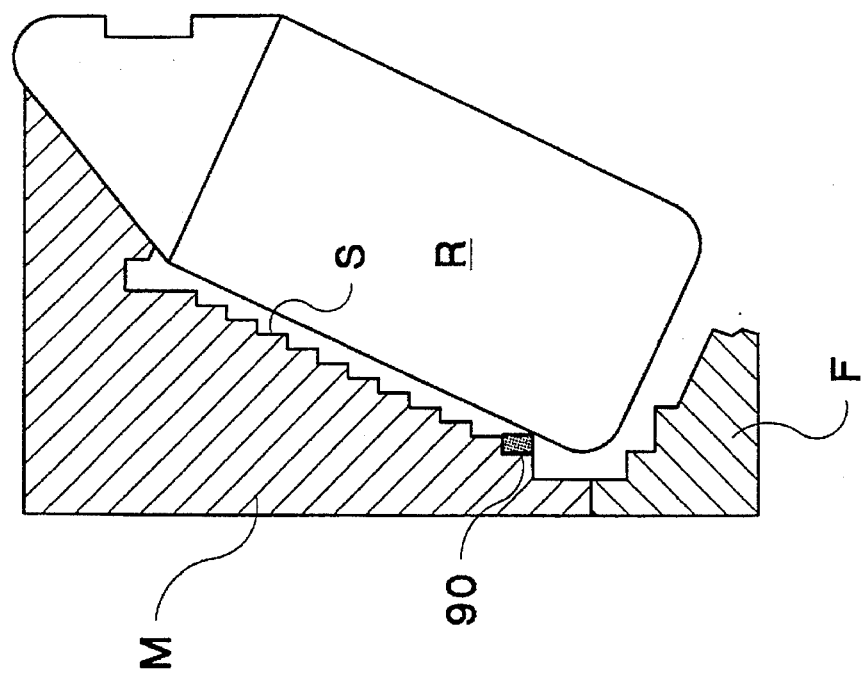
FIG. 7D illustrates the ring segment placed between a sample tube aperture core and the frustum shaped cavity interior of the male mold member.

It is also possible to use ring segment 90 for this same effect. Referring to FIGS. 7C and 7D, ring segment 90 is shown backing sample tube aperture core R relative to internal female steps S of male mold member M.

Figure 8A:
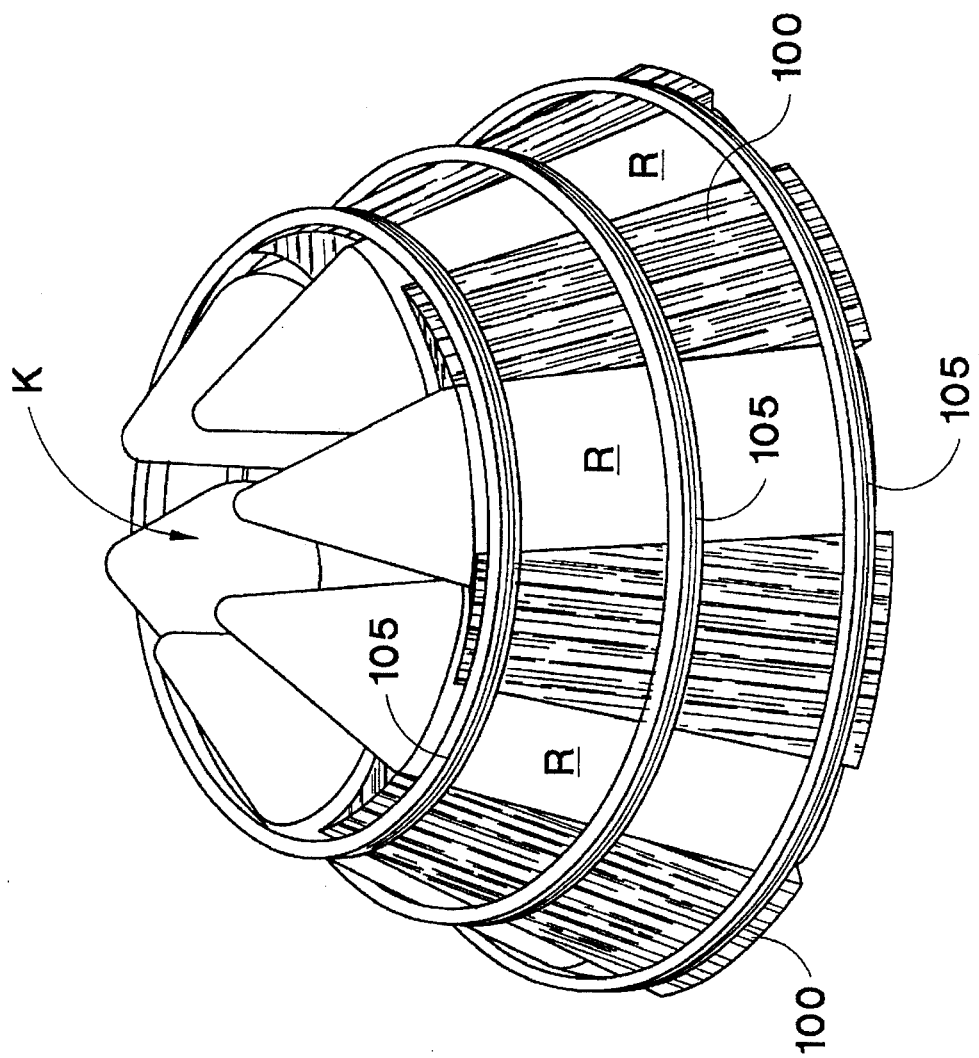
FIG. 8A is a perspective view of a sample tube aperture core cluster here illustrating the cluster surrounded by pre-wound and cured fiber rings, the fiber rings being keyed to and supported from fiber material to be pressure molded, this material being placed between the sample tube aperture cores.
Figure 8B:
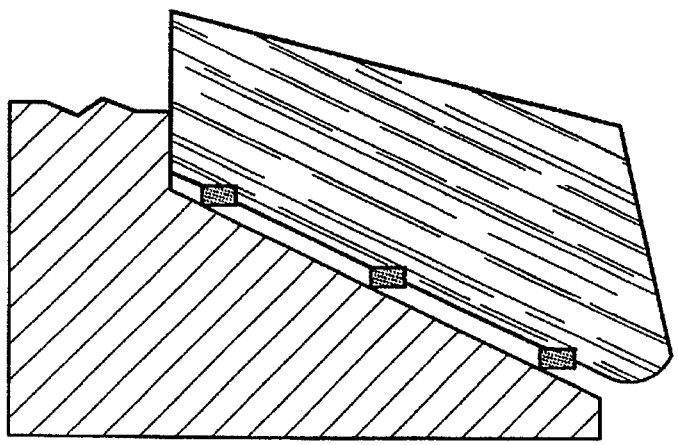
FIG. 8B is a radial section taken from the cluster of FIG. 8A illustrating resin impregnated composite material having at least some vertically oriented fibers with the resin impregnated material being provided with notched keyways for keying the pre-wound and cured fiber rings into proper vertical relationship relative to the compression molded rotor core to be formed.
Figure 8C:
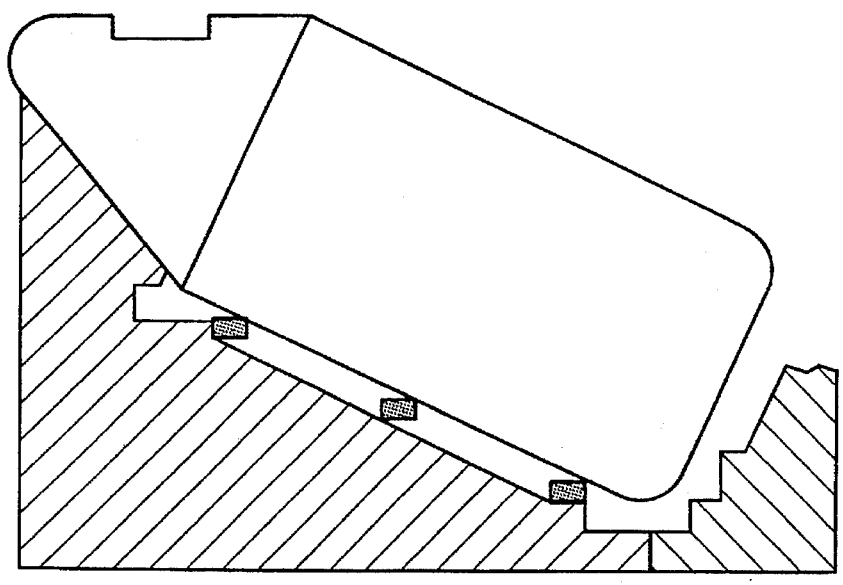
FIG. 8C is a radial section taken from the cluster of FIG. 8A illustrating the section of the rotor body at the sample tube aperture cores illustrating the placement of the pre-wound and cured fiber rings between the sample tube aperture cores and the frustum shaped cavity of the male mold member for bracing the core cluster in proper relationship during compression molding.

Referring to FIGS. 8A–8C, it is possible to reinforce the compression molded rotor body with wound and pre-cured resin fiber rings 105. This can be done when frustum shaped central cavity C is configured without internal female steps S or with smooth frustum shaped internal female surface 106. Referring specifically to FIG. 8C, it will be seen that wound and pre-cured resin fiber rings 105 occupy the interstitial volume 107 between sample tube aperture cores R and frustum shaped central cavity C interior of male mold member M. At the same time, and referring to FIG. 8A and 8B, it will be seen that pre-impregnated fiber mass 100 fits between respective sample tube aperture cores R. In this location, it is possible to use pre-impregnated fiber mass 100 with ring supporting notches 102 to support respective wound and pre-cured resin fiber rings 105. Thus, with frustum shaped central cavity C of male mold member M charged with sample tube aperture core cluster K, pre-impregnated fiber mass 100 and wound and pre-cured resin fiber rings 105, a rotor body without male steps T can be fabricated which has ring reinforcement. Such a rotor body requires no further finishing.

Figure 9B:
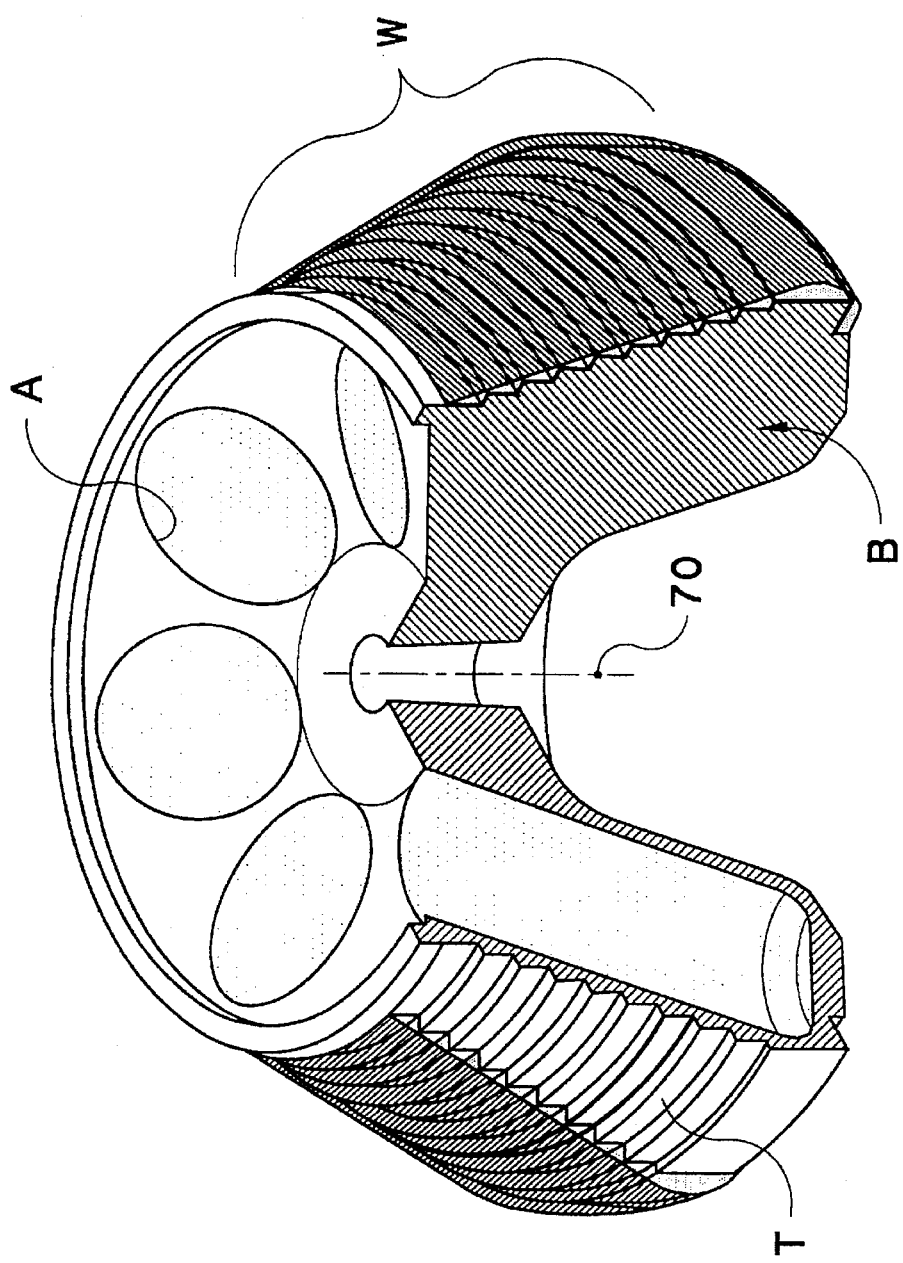
FIG. 9B illustrates the net shaped rotor body of FIG. 9A wound with continuous fibers to provide hoop stress resistance to radial forces generated during centrifugation.

Referring to FIG. 9B, finishing of rotor body B is illustrated. Specifically, resin fiber windings W are tension wound and cured over male steps T. Such winding and curing secures under tension resin fiber windings W to the exterior surface of rotor body B to provide additional resistance against the forces of centrifugation.

Figure 10C:
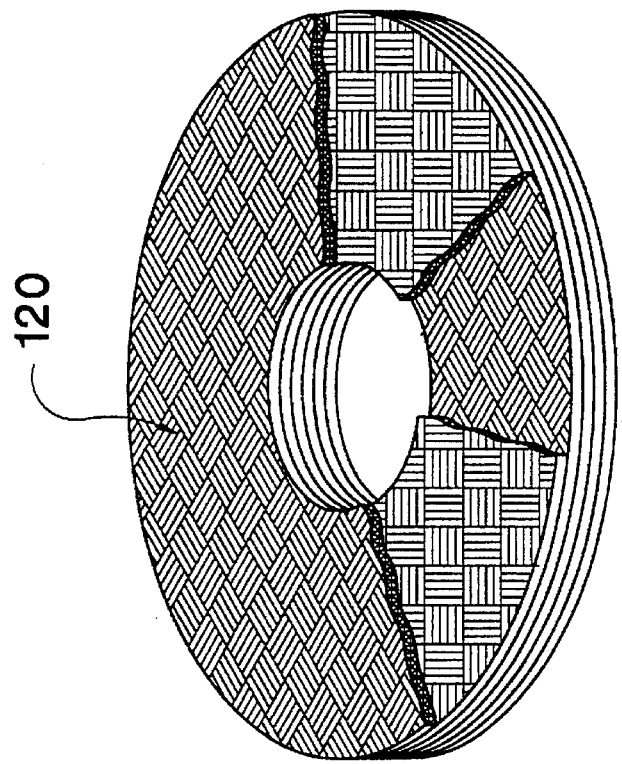
FIG. 10C is a view similar to FIG. 10B illustrating pre-impregnated woven fabric with composite material fibers cut for compression molding as by placement in the female mold member of FIG. 3A.
Figure 10B:
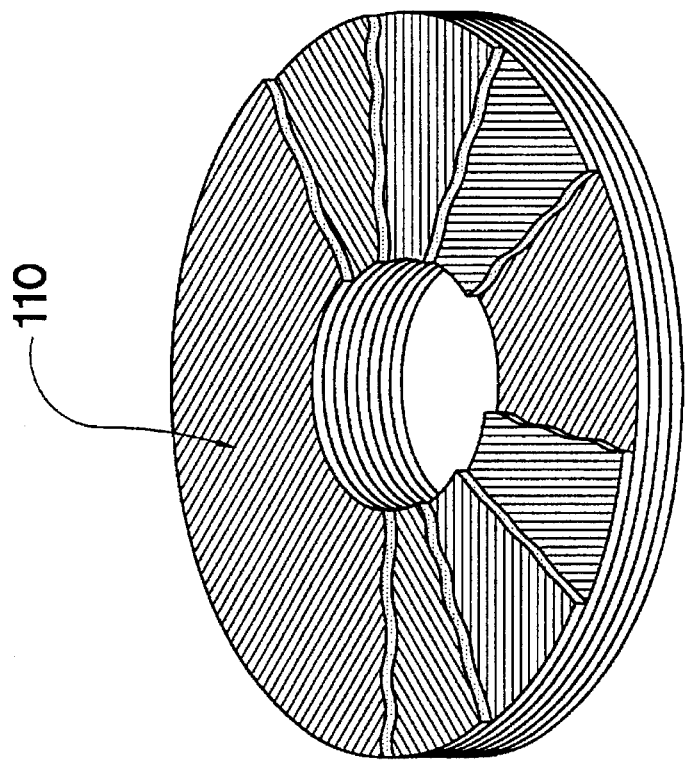
FIG. 10B illustrates pre-impregnated directional composite material tape cut for compression molding as by placement in the female mold member of FIG. 3A.

It will be apparent that the illustrated molding process provides superior flexibility. Specifically, and using the compression molding cavities here illustrated, all shapes of fibers can be compression molded. For example, and referring to respective FIGS. 10B and 10C successive angularly alternated impregnated tape 110 or successive angularly alternated woven fiber 120 can be pre-impregnated and compression molded in female mold member F here illustrated. Likewise, this invention will admit of other variations to the compression molding herein set forth.

Compression molding is known.

Observation of the compression molded part is helpful. It is common in metallic centrifuge rotors to forge metal blanks or "forgings" for such rotors. When such forging occurs, and the metal resulting from such forging is microscopically examined, especially as to the granular structure, the metallic grains can be treated so as to be optimally aligned to resist the forces of centrifugation.

Figure 10D:
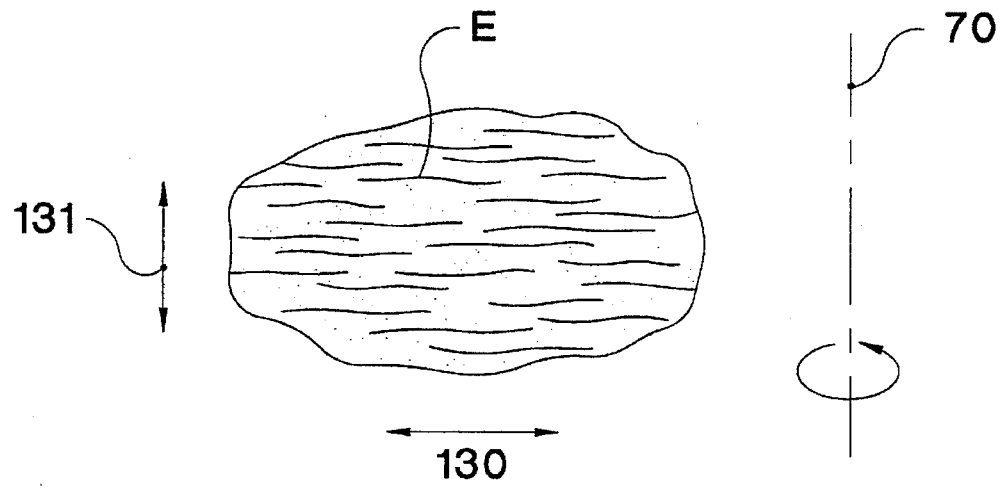
FIG. 10D is an expanded detail of a radial section taken through the rotor body of FIG. 9A illustrating the fiber alignment of the cured sheet molding compound illustrating the absence of layering and illustrating the primary normal orientation of the discontinuous fibers to the spin axis of the rotor body with only minor vertical excursion of the random fibers.

It is to be understood that the present process of compression molding is analogous when it comes to alignment of fibers with respect to the resultant compression molded rotor body B as seen in FIG. 9A and 9B. Specifically, and when sheet molded compound 65 is utilized, fibers normal to the spin axis result. (See FIG. 10D) Cutting such a rotor body in section results in a view of cured fibers E "flowing" along planes normal to the spin axis or parallel to horizontal vector 130. Such a plane normal to rotor spin axis 70 is illustrated by spin axis normal vector 131. It will be observed that no measurable kinking is present in such fibers. Moreover, only in minor detail do the fibers depart from the original alignment of sheet molded compound 65. Taking the case of vertical vector 131 disposed parallel to rotor spin axis 70, it will be observed that individual fiber excursion from the plane of spin axis normal vector 130 is small, yet present in sufficient amount to enable sufficient vertical strength to be present in the rotor body to resist those forces generated parallel to rotor spin axis 70. This appearance is distinctive and is illustrated herein at FIGS. 10D.

Figure 10E:
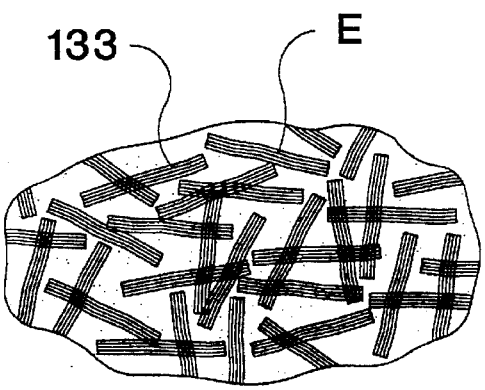
FIG. 10E is an expanded detail of a section taken through one of the sample tube apertures illustrating the lack of fiber breaking in fiber abutment to the sample tube cores and illustrating typical fiber conformance at the sample tube cores.

Referring to FIG. 10E, when fibers E encounter a mold boundary, again the appearance is distinctive. First, there is little evidence of the fibers being sheared. Second, the fibers present a checkered almost "marbleized" appearance when seen with the eye. Finally, the fibers align themselves parallel to the surface which they encounter at the boundary of a mold.

Figure 10F:
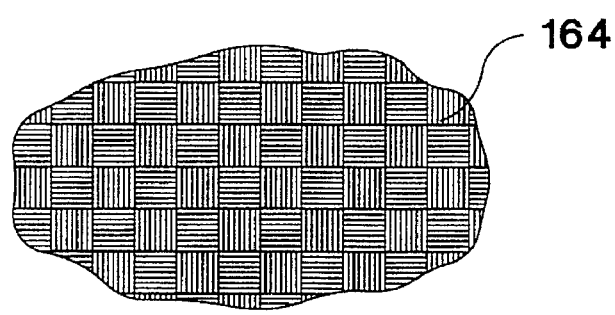
FIG. 10F is a detail of the fiber alignment at the exterior of the rotor body where wrapping of the frustum shaped surface of the rotor body occurs with fabric warp over a central core composed of sheet molding compound as illustrated in FIG. 3B.

Referring to FIG. 10F, it is preferred to place fabric around the frustum shaped periphery of the mold as illustrated in FIG. 3B. Taking the case where resin impregnated fiber layer 64 is made from resin impregnated fabric, the fabric clearly appears only at the boundary. Such resin cured woven composite fabric 164 is illustrated in FIG. 10F. It will be noted that the interior of sample tube apertures A when formed with composite fiber cloth sock 80 around sample tube aperture cores R has a similar appearance.

It is to be emphasized that for the first time, a compression molded rotor body B is produced. No longer is it required that sample tube apertures A be machined. Specifically, they can now be molded. And more importantly, they can be molded to shapes that are other than cylindrical.

Figure 11A:
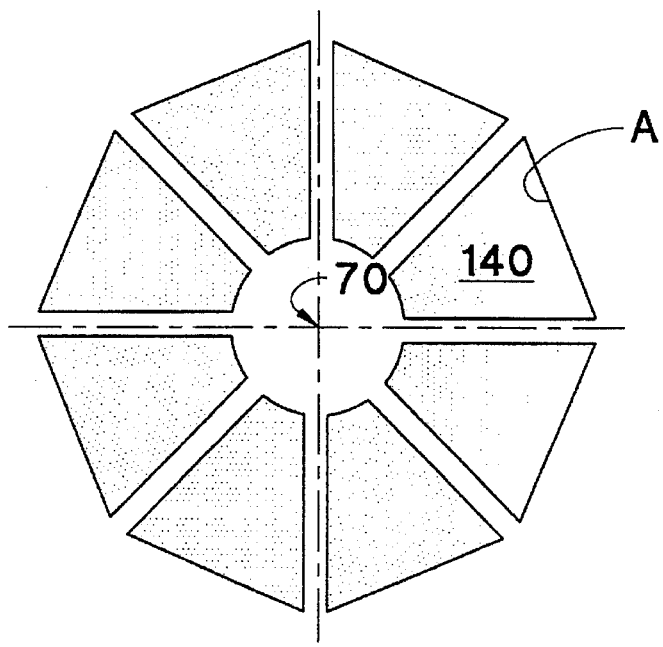
FIG. 11A–11D illustrates alternate sample tube aperture cores of this invention illustrating the principle that with molded rotor bodies it is no longer required that sample tube apertures be only of cylindrical configuration with FIG. 11A illustrating a triangular sample tube apertures section, FIG. 11B illustrating an elliptical sample tube aperture section, FIG. 11C illustrating a pie shaped sample tube aperture section, and FIG. 11D illustrating a pyramid sample tube aperture section; and, FIG. 12 is a section of a compression molded rotor having a ring configuration suitable for use with that centrifuge shown and disclosed in Centrifuge Construction Having Central Stator—Ser. No. 08/288,387 filed Aug. 10, 1994 now U.S. Pat. No. 5,505,684 issued Apr. 9, 1996.

Referring to FIG. 11A, a cross section of sample tube aperture A having a triangular cross section 140 relative to rotor spin axis 70 is illustrated.

Figure 11B:
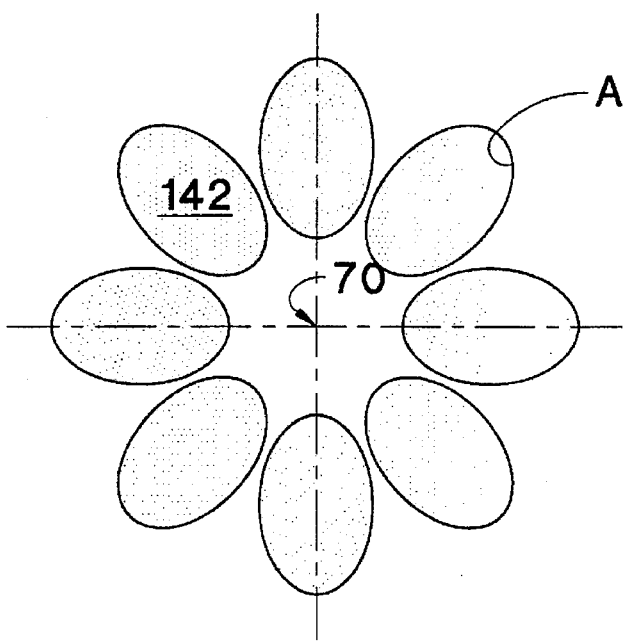

Referring to FIG. 11B, a cross section of sample tube aperture A having an elliptical cross section 142 relative to rotor spin axis 70 is illustrated. It will be noted that the major axis of the ellipse is radially aligned relative to rotor spin axis 70.

Figure 11C:
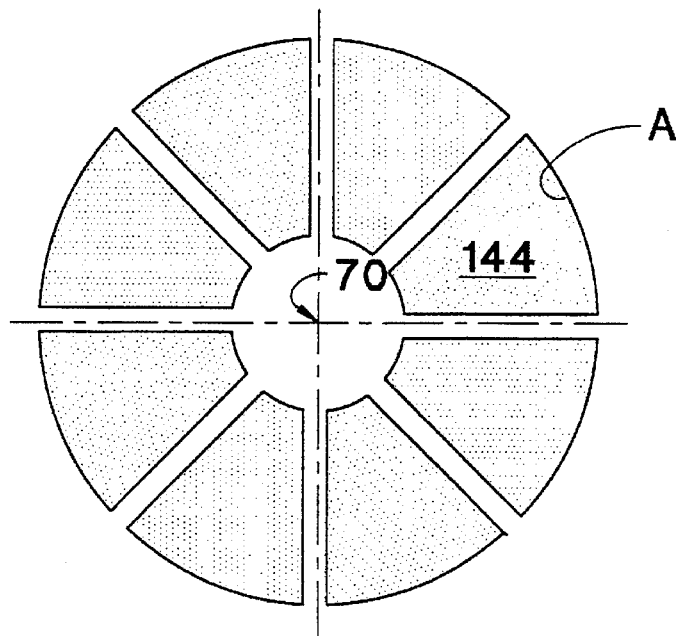

Referring to FIG. 11C, a cross section of sample tube aperture A having a pie shaped cross section 144 relative to rotor spin axis 70 is illustrated. It will be noted that the apex of the pie shape is disposed towards rotor spin axis 70.

Figure 11D:
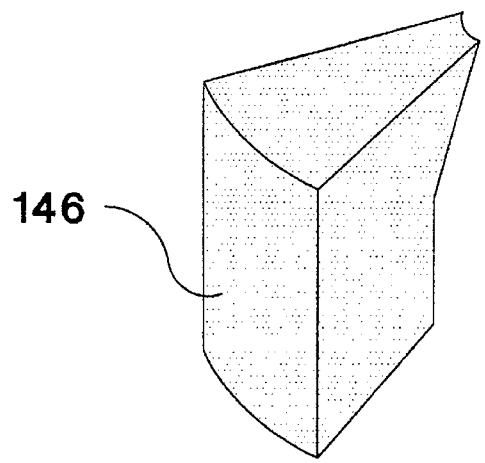

Finally, and referring to FIG. 11D, a cross section of sample tube aperture core R having pyramid shaped three dimensional section 146 is illustrated. It goes with out saying that such a sample tube aperture core R will form sample tube aperture A having a complimentary female cross section.

Observing FIGS. 11A–11D, some observations can be made about the varied sample tube apertures A. First, they are molded and all other than cylindrical. Second, it is required that sample tube aperture cores R all be capable of releasing from the mold. Such release here is shown in its preferred embodiment from male mold member M. It will be understood that release from female mold member F could likewise occur. Further, mold members with straight sample tubes—parallel to the direction of mold release—will not require release of sample tube aperture cores R.

In co-pending Centrifuge Construction Having Central Stator, Ser. No. 08/288,387 filed Aug. 10, 1994, now U.S. Pat. No. 5,505,684 issued Apr. 9, 1996, inventor Piramoon has disclosed the construction of a new centrifuge. Specifically, this centrifuge contains a central stator which produces a rotating magnetic field. The peripheral rotor couples to this rotating magnetic field. It will be understood that to accommodate the central stator, some section of the ultimately produced rotor body $B_1$ has to be ring shaped. Such a ring shaped rotor body $B_1$ is illustrated in FIG. 12.

Figure 12:
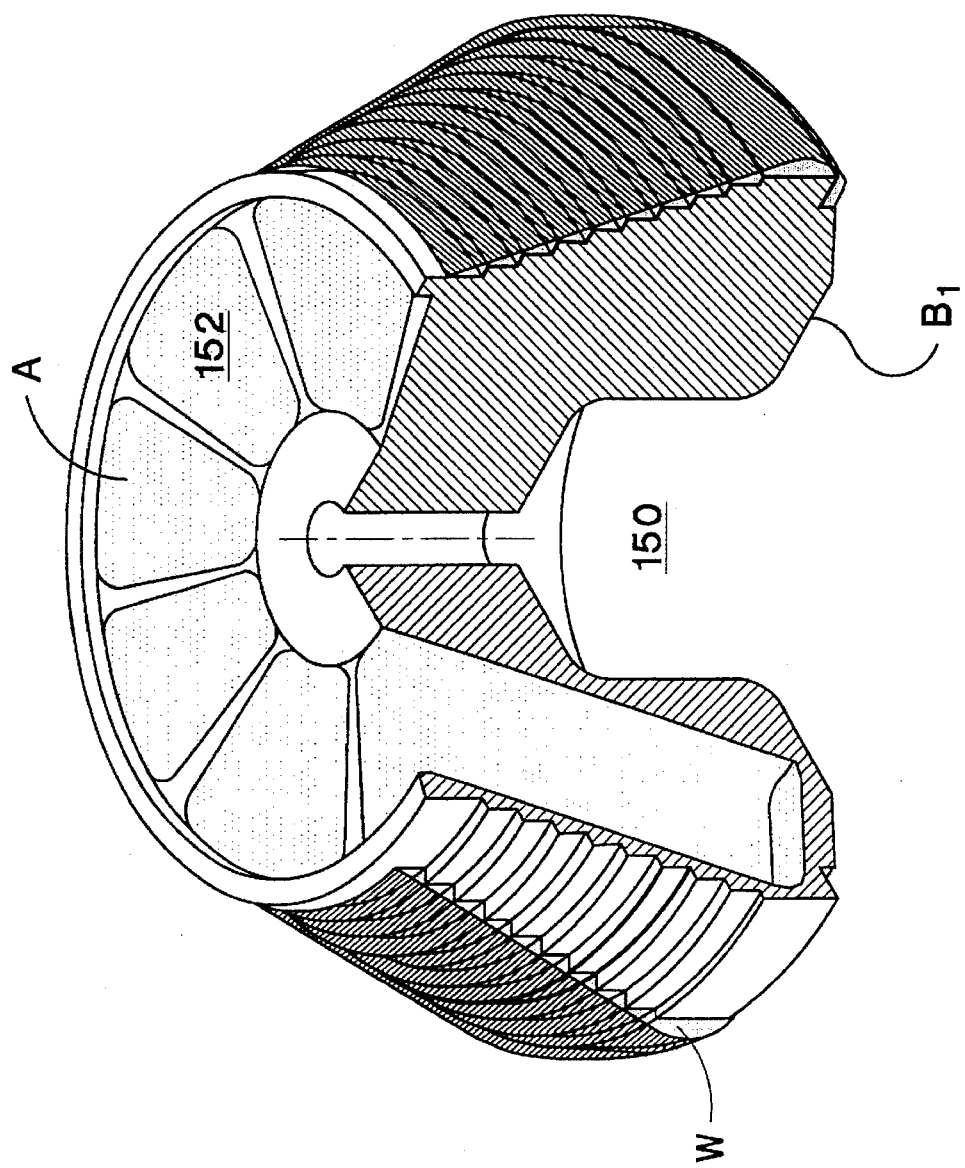

Referring to FIG. 12, rotor body $B_1$ includes a central stator aperture 150, and maximum capacity shaped sample tube apertures 152. Some comment is in order.

First, the molding apparatus here illustrated can be modified to make any shape of rotor body B. We prefer the fixed angle embodiment of rotor body B as of this time. It will be understood that with the introduction of additional centrifuges, other rotor bodies may be required such as rotor body $B_1$ having central stator aperture 150.

Secondly, we now understand that rotor body $B_1$ first disclosed in Centrifuge Construction Having Central Stator Ser. No. 08/288,387 filed Aug. 10, 1994 now U.S. Pat. No. 5,505,684 issued Apr. 9, 1996, has several advantages over conventional spindle mounted rotors. First, it requires a larger diameter. This results in a lower speed of rotation. Further, a greater number of sample tube apertures A can be accommodated. For example the reader will observe eight sample tube apertures A in FIG. 12.

Secondly, it is especially advantageous to change of the shape of sample tube apertures A to maximize capacity of the sample tube apertures and any tubes which are subsequently placed within them. As such rotor body $B_1$ is conventionally reinforced by resin fiber windings W, the maximum capacity shaped sample tube apertures 152 do not appreciable detract from the overall rotor resistance to the forces of centrifugation.

It will therefore be understood that the enclosed described compression molded rotor has wide applicability.

What is claimed is:

1. A fixed angle centrifuge rotor body comprising:

a frustum shaped peripheral contour about a central spin axis between a base end and an apex end;

angled sample tube apertures defined in the rotor body extending from openings in the apex end adjacent the spin axis of the rotor body to bottom portions of the sample tube apertures more remote from the spin axis of the rotor body;

the rotor body formed from resin cured about discontinuous composite fibers to form resin cured discontinuous composite fibers with a major axis of the discontinuous composite fibers disposed normal to the spin axis of the rotor body interior of the rotor body;

the discontinuous composite fibers exceeding 40 weight percent of the resin cured discontinuous composite fibers and having no visible layering between respective fibers;

the resin cured discontinuous composite fibers having minor vertical excursion parallel to the spin axis of the rotor body and relatively no kinking along their respective length; and, the resin cured discontinuous composite fibers disposed parallel to surfaces of and about the sample tube apertures in the rotor body.

2. A fixed angle centrifuge rotor body according to claim 1 comprising:

the angled sample tube apertures defined in the rotor body are molded sample tube apertures.

3. A fixed angle centrifuge rotor body according to claim 2 comprising:

the molded sample tube apertures are not cylindrical.

4. A fixed angle centrifuge rotor body according to claim 2 comprising:

the molded sample tube apertures have a tapered configuration relative to the rotor body from the openings at the apex end adjacent the spin axis.

5. A fixed angle centrifuge rotor body according to claim 2 comprising:

the molded sample tube apertures have a cross section which has a larger dimension measured along a circular segment about the spin axis adjacent the frustum shaped peripheral contour than a dimension measured along a circular segment about the spin axis and adjacent the spin axis.

6. A fixed angle centrifuge rotor body according to claim 1 comprising:

the fixed angle centrifuge rotor body has a cylindrical aperture symmetrically configured about the rotor spin axis.

7. A fixed angle centrifuge rotor body according to claim 1 comprising:

the resin cured discontinuous composite fibers include added material selected from the class consisting of micro-balloons and fiber glass.

\* \* \* \* \*